US010328577B2

(12) United States Patent
Lawrence et al.

(10) Patent No.: US 10,328,577 B2
(45) Date of Patent: Jun. 25, 2019

(54) AUTONOMOUS NAVIGATIONAL SYSTEM FOR FLOOR PREPARATION AND MAINTENANCE EQUIPMENT

(71) Applicant: Xiaoyu Abrasive Inc., Orlando, FL (US)

(72) Inventors: Michael Lawrence, Windermere, FL (US); Penglai Guo, Windermere, FL (US); Patrick Rowe, Pittsburgh, PA (US); Parag Batavia, Wexford, PA (US)

(73) Assignee: Xiaoyu Arasive Inc., Orlando, FL (US)

( * ) Notice: Subject to any disclaimer, the term of this patent is extended or adjusted under 35 U.S.C. 154(b) by 0 days.

(21) Appl. No.: 15/491,938

(22) Filed: Apr. 19, 2017

(65) Prior Publication Data

US 2017/0297202 A1    Oct. 19, 2017

Related U.S. Application Data

(60) Provisional application No. 62/324,367, filed on Apr. 19, 2016.

(51) Int. Cl.
*G01C 22/00*  (2006.01)
*B25J 9/16*  (2006.01)
*G05D 1/02*  (2006.01)

(52) U.S. Cl.
CPC ............ *B25J 9/1697* (2013.01); *G05D 1/024* (2013.01); *G05D 1/0219* (2013.01); *G05D 1/0274* (2013.01); *G05D 2201/0203* (2013.01)

(58) Field of Classification Search
CPC .. G05D 1/0214; G05D 1/0219; G05D 1/0248; G05D 1/0274; G05D 2201/0203; B25J 9/1697

USPC .......................... 701/25; 700/245; 901/1, 47
See application file for complete search history.

(56) References Cited

U.S. PATENT DOCUMENTS

| | | | |
|---|---|---|---|
| 7,085,624 B2 | 8/2006 | Aldred et al. | |
| 7,805,220 B2 | 9/2010 | Taylor et al. | |
| 8,798,840 B2* | 8/2014 | Fong | G05D 1/0274 701/23 |
| 9,307,368 B1* | 4/2016 | Bartlett | H04W 4/04 |
| 9,468,349 B2* | 10/2016 | Fong | G05D 1/0274 |
| 2007/0282484 A1* | 12/2007 | Chung | G05D 1/0274 700/245 |
| 2008/0065265 A1* | 3/2008 | Ozick | G05D 1/0231 700/245 |
| 2008/0282494 A1* | 11/2008 | Won | A47L 5/30 15/319 |
| 2009/0149990 A1* | 6/2009 | Myeong | G05D 1/0274 700/245 |
| 2009/0281661 A1* | 11/2009 | Dooley | A47L 11/4036 700/258 |
| 2013/0138246 A1* | 5/2013 | Gutmann | G05D 1/0231 700/253 |

(Continued)

*Primary Examiner* — Shardul D Patel
(74) *Attorney, Agent, or Firm* — Wolf, Greenfield & Sacks, P.C.

(57) ABSTRACT

According to embodiments of the present disclosure is an automatic floor preparation or maintenance system. The system uses a laser rangefinder to map a workspace, while a path planning module uses the map to determine a path for the concrete polishing vehicle to travel. A propulsion system moves the vehicle along the determined path. A user interface allows an operator to remotely monitor the autonomous operations.

20 Claims, 9 Drawing Sheets

(56) References Cited

U.S. PATENT DOCUMENTS

2015/0157182 A1* 6/2015 Noh ................. G05D 1/0231
                                                    701/28
2017/0297455 A1* 10/2017 Romanov ........... A47L 11/4036

* cited by examiner

AUTONOMOUS NAVIGATIONAL SYSTEM FOR FLOOR PREPARATION AND MAINTENANCE EQUIPMENT

CROSS-REFERENCE TO RELATED APPLICATIONS

This application claims priority to U.S. Provisional Application Ser. No. 62/324,367, filed Apr. 19, 2016, incorporated by reference herein in its entirety.

STATEMENT REGARDING FEDERALLY SPONSORED RESEARCH

Not applicable.

BACKGROUND OF THE INVENTION

The invention relates generally to an automated navigational system for floor preparation and maintenance equipment. More specifically, the invention relates to a system that maps an area of floor to be prepared or maintained, develops a plan for preparing or maintaining the area, and controls a floor preparation or maintenance machine to follow a path defined by the plan.

Floor preparation and maintenance is a necessary treatment in commercial and residential settings. A variety of floor finishes require myriad floor maintenance processes and all floor finishes require an initial preparation process that is labor intensive. The process of preparing a floor may for example involve using a polishing machine with a rotating head with abrasives in contact with the concrete to grind, seal, and polish the floor using different abrasive grits to achieve the desired finish. Although much of the process depends on the skill and experience of the preparation crew, the motion of the machines themselves is highly repetitive, making this a suitable application for automation. It would therefore be advantageous to develop an autonomous floor preparation system that reduces the amount of labor involved in preparing a floor.

BRIEF SUMMARY OF THE INVENTION

According to embodiments of the present disclosure is a system for preparing and maintaining floors. In one embodiment, the system comprises a concrete polishing vehicle, a drive propulsion system, a navigation system, and user interface. The automatic concrete polishing system may further include a power management system and operational logic executed by a processor on the system.

In one embodiment, the concrete polishing vehicle comprises a polishing head, vehicle frame, and wheels. The drive system is a set of actuators and encoders connected to the wheels of the concrete polishing vehicle. The actuators cause rotation of the wheels and the encoders accurately record the true rotation of each wheel to determine the position of the vehicle.

The navigation system uses data from the wheel encoders and a high-accuracy laser rangefinder to measure the vehicle's position, heading, and speed. Additionally, the laser system is able to automatically build a map of the workspace, which is then used by planning software to plan a coverage pattern for the vehicle. The navigation system further comprises a path tracking module, which guides the vehicle precisely along the planned path. In one configuration, bump sensors in the front and rear of the vehicle let the system know if the vehicle has encountered an obstacle in its path and stop appropriately. The navigation system can further include workspace generation and obstacle detection modules. The workspace generation module distinguishes the area over which the machine is to go from the general map/environment as initially detected by the navigation system. The obstacle detection module detects obstacles according to various parameters (within a certain proximity, width, line of sight, etc.) and submits that to the path planning module for it to plan a better path, now taking into account the obstacles. Alternate configurations would include visual sensing through radar, sonar or other electromagnetic or sonic mechanisms.

The user interface comprises a plurality of buttons and other indicators on the vehicle itself. The interface allows an operator to quickly and easily configure, start, and stop the automated operation. In one embodiment, the interface further comprises a mobile device-based graphical user interface (GUI) that communicates wirelessly with the vehicle. The off-board interface can be accessed via an application executed on a laptop, smart phone, or tablet.

In some configurations, a power management system is provided to convert the power received by the vehicle to a voltage usable by the drive propulsion and navigation systems. Additionally, operational logic may be provided to control and orchestrate the different sub-systems at different stages of the polishing process, including controlling the operation and speed of the polishing heads. The operation logic is further adapted to process data from the encoders, laser rangefinder, and other sensors, such as a gloss sensor, for example.

By automating the movement and control of the floor preparation and maintenance machine, the operator will suffer less fatigue. Some currently-available machines weigh greater than 1000 pounds and are manually pushed and pulled across the floor by the operator. In addition, the machine itself exerts a back-torque that must be countered by the strength of the operator. As such, the operation of the machine is physically demanding and quality can suffer as the operator becomes fatigued. Automation of floor preparation and maintenance machines can also reduce labor costs. For example, if the operator does not have to constantly control the preparation or maintenance machine, then he can be freed up to perform other tasks, such as hand polishing in corners or other areas of the floor that the machine cannot reach. Or, an operator can set-up and monitor multiple automated machines running simultaneously.

Further efficiency gains can be produced by having the automated floor preparation and maintenance system execute a precise coverage pattern, as opposed to a human operator who may vary in the amount of overlap for each pass. For example, reducing the overlap between adjacent "lanes" by just 11%, a significant amount of time can be saved. For example, in a 60 foot by 60 foot area (which is representative of a free-standing retail store), each lane is 60 feet long and a forward and backward pass are completed in each lane for a total of 120 linear feet per lane. If the floor preparation and maintenance machine is 36" wide and each lane overlaps its neighbor by 18" (50%) when controlled manually, then there are 40 total lanes (60' wide/1.5' wide per lane) for a total of 4,800 linear feet (120'×40) of polishing. At a typical speed of 10 feet/minute, 480 minutes (8 hours) are required for the entire job. The overlap is necessary to ensure complete coverage for an operator who can vary substantially in the amount of overlap for each pass.

With the precise control of the automated system, the amount of overlap can be decreased by 2 inches per lane (11% reduction), meaning the width of the non-overlap width is 20" rather than 18". There are now 36 lanes (60' wide/1.67' wide per lane) instead of 40. The reduction of four lanes results in a 48 minute reduction in polishing time. For large-scale retail space of 100,000 square feet, the reduction in time can be 22 hours.

DETAILED DESCRIPTION OF THE INVENTION

Figure 1:
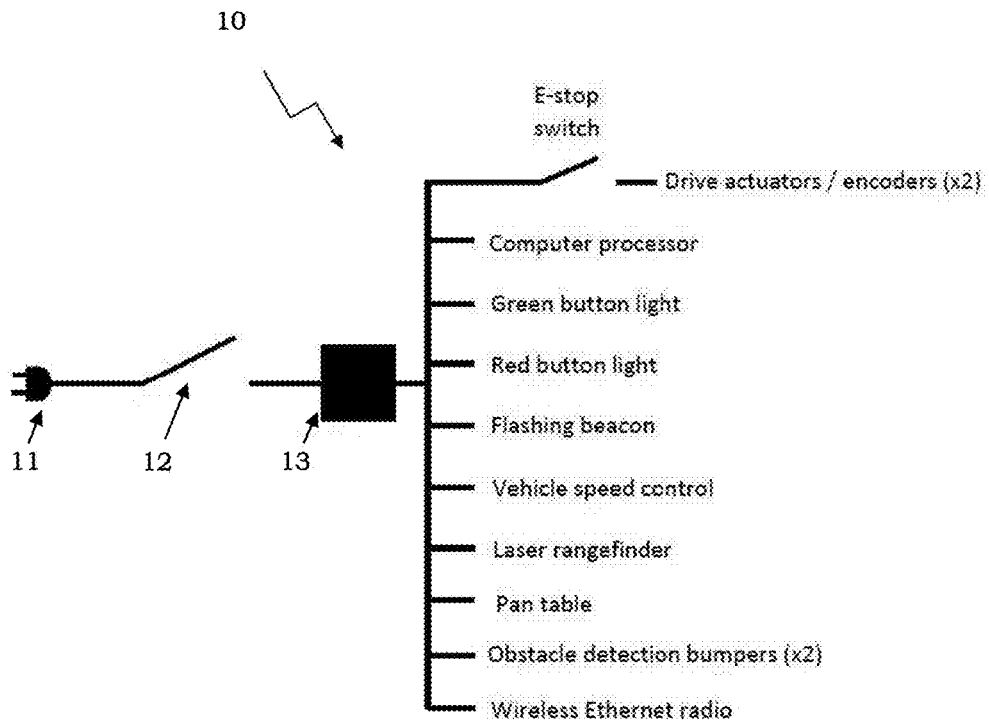
FIG. 1 is a schematic of the power distribution system for the automatic concrete polishing system, according to one embodiment.

According to one embodiment, the floor preparation and maintenance system comprises a drive propulsion system, a navigation system, and a user interface. In some embodiments, operation logic is provided in the form of multiple software modules executed by a processor. Further included in some embodiments is a power management system to reduce the power supply voltage to levels usable by components of the subsystems, such as sensors, processors, and encoders, for example. The drive propulsion system, navigation system, and user interface can be retrofitted onto an existing floor preparation or maintenance machine or, alternatively, the systems can be manufactured into a unitary automatic floor preparation or maintenance system.

The drive propulsion system comprises at least one actuator and encoder connected to each wheel of a floor preparation or maintenance vehicle. In one configuration, the actuator comprises a combined motor and controller unit. A person having skill in the art will appreciate that the motors are sized to provide an appropriate amount of torque to move the machine. The vehicle includes the polishing head, frame, wheels, and other components that may be found on manual floor preparation and maintenance machines. The actuators cause rotation of the wheel, whereas the encoders accurately sense the rotation. The data obtained by the encoders are used by the navigation system. If the automatic floor preparation and maintenance system is integrated into an existing machine, the vehicle emergency stop system can tie into the drive actuators.

In one configuration, the vehicle moves at linear speeds ranging from 10-20 feet per minute (0.05-0.10 m/s), which is comparable to manually driven machines. Control of the vehicle's linear speed is accomplished using low-level motor controllers that are present on the drive actuators. For a differential drive vehicle such as the automatic concrete polishing system, the linear speed and steering angle are coupled. That is, turning is done by driving one wheel at a faster speed than another wheel. Speed commands are combined into a single rotational velocity command that is sent to each drive motor at a relatively fast rate (10-50 Hz), which the low-level actuator control used to achieve the desired drive characteristics.

In one configuration, the automatic floor preparation and maintenance system has front and rear obstacle detection bumpers that provide a go/no-go signal for the overall motion of the vehicle. That is, the bump sensors let the system know if the vehicle has encountered an obstacle in its path. The bump sensors comprise binary on/off touch sensors and the vehicle moves only if the touch sensor in the direction of motion is not triggered. Depending on the environment in which it is used, human intervention may be required to restart the motion of the vehicle if an obstacle event is detected.

To accurately determine the position of the automatic floor preparation or maintenance vehicle, a navigation system is provided. Using the navigation system, the automatic floor preparation or maintenance system can calculate the absolute position and heading of the vehicle anywhere in the workspace relative to a given point of origin. In areas where there are no walls or infrastructure to assist with navigation, artificial landmarks such as cardboard can be provided. The automatic floor preparation and maintenance system, relying at least in part on the navigation system, can plan a coverage pattern that emulates human operation (e.g. rotating left/right at the start/end of a linear stretch, wiggling the machine to initiate movement, etc.).

In one embodiment, the navigation system comprises a 360 degree omnidirectional camera that identifies fixed artificial landmarks, such as colored surfaces or active lights. Although, with a camera-based system, a calibration procedure should be performed in each new workspace. Calibration involves moving the vehicle a short distance and placing artificial landmarks in the workspace. Because of the drawbacks associated with the camera-based system, a laser rangefinder is used in an alternative embodiment.

In the alternative embodiment, the laser rangefinder provides range and bearing data without any complex processing, unlike the camera-based system. Since most floor preparation or maintenance operations are done indoors, existing walls and corners act as "natural" landmarks for the laser rangefinder that can be used to navigate. Given the size of a typical retail store, the laser could require a range of 30 m with 360° coverage.

In yet another alternative, a long-range, single-point laser rangefinder is used on either on a continuous pan table or aimed at a spinning mirror whose angular position is measured with a high-resolution encoder. The single-point laser rangefinder is a lower cost component than the laser rangefinder with 360° coverage, but provides similar functionality. For example, one particular single-point laser has a maximum range of 30 m (150 m to a highly reflective surface) with a resolution of 3 mm. In any of the described embodiments, the laser rangefinder can be mounted on a post on the vehicle so it has a clear view of the walls above the heads of people and other obstacles on the ground in the environment.

The navigation system further comprises a positioning subsystem, which uses data from the wheel encoders on the drive motors (relative) and the laser rangefinder (absolute) to measure the vehicle's position, heading, and speed anywhere in the workspace. By measuring the rotation of the wheels and knowing the wheel diameter, the distance each wheel has traveled can be calculated. From this information, both the change in the vehicle's position and heading can be found. In some situations, relying on the drive wheel encoders alone to calculate the position and heading is not sufficient as it provides only an incremental measurement from a starting location. For example, if the wheels slip or the vehicle skids, errors are introduced into the measurements. As a result, the laser rangefinder, which measures the vehicles absolute position and heading in the workspace, is used for precise location determination.

The laser rangefinder is further used to construct a map of the workspace to be prepared or maintained. To create a map, the laser rangefinder scans the area to make a 2D map of the walls and corners present in the workspace. The map can be created when the vehicle is placed in its starting location. In other embodiments, the map can be created before the polishing process begins to allow for review or revision by the operator. In large or non-typical environments, artificial landmarks can be located in the environment to mark boundaries of the workspace. Corner markers are ideal landmarks because they provide information in both the x and y dimensions. In this example, a corner finding algorithm is employed to find the (x,y) coordinates of each corner relative to the vehicle's starting position as it travels in the workspace. For example, as the vehicle moves, the laser rangefinder continuously measures the location of the corners relative to its current position. A homogenous transform converts the local corner coordinates back to the global corner coordinates that were found in the initial map.

In some embodiments, operational logic in the form of a software module is provided to plan a coverage pattern. The operational logic can be part of the navigation system or it can be a standalone subsystem. The operational logic can further control and orchestrate the different sub-systems at different stages of the polishing process including controlling the operation and speed of the polishing heads. As will be described in greater detail, the operational logic module can also control status indicator lights, beacons, and other outputs on the vehicle.

Figure 7A:
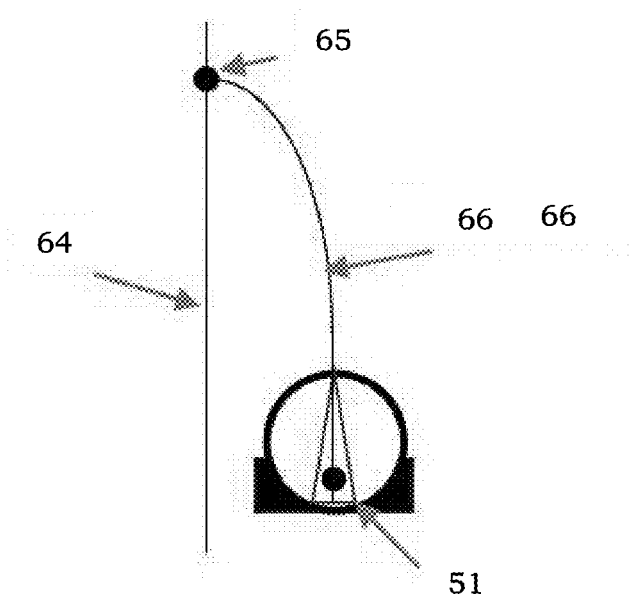
FIGS. 7A-7B show different path tracking scenarios.
Figure 7B:
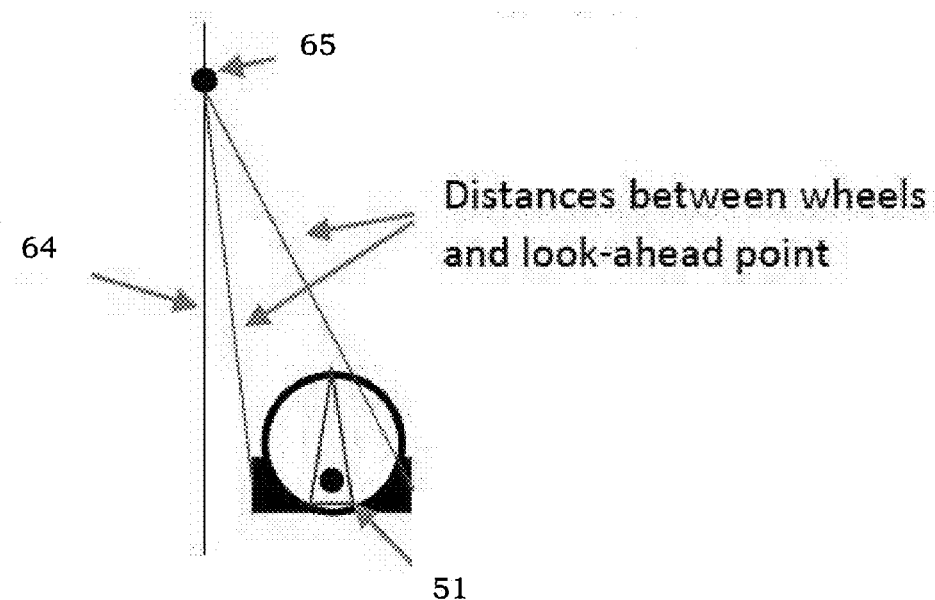

Referring to FIGS. 7A and 7B, the path planning module 38 uses information from the positioning subsystem to output the appropriate drive motor commands to guide the vehicle 51 precisely along the planned path. A path tracking algorithm can also be included to receive the path description from the path planning module 38. The path description consists of a series of straight lines and point turns to rotate the vehicle side-to-side at the beginning and end of each straight line path segment, in one configuration. For the point turns, the vehicle will simply be commanded to rotate in the appropriate direction at the desired rotational speed until it has reached the requested angle.

For the straight line segments, there are several well-known techniques for computing the appropriate velocity commands to each drive motor in order to keep the vehicle 51 aligned with the path 64. One technique, known as "pure pursuit" has the vehicle 51 follow a virtual "look-ahead point" 65 positioned on the path 64 somewhere in front of the vehicle 51. The distance between the look-ahead point 65 and the vehicle 51 determines the sensitivity of the steering commands (e.g. too far away and the vehicle 51 takes a long time to align with the path 64, but too close can result in oscillatory motion). The pure pursuit algorithm constantly computes an arc 66 between the current location of the vehicle 51 and the look-ahead point 65. The radius of the arc 66 defines the steering command. This technique is shown graphically in FIG. 7A.

A second technique, shown graphically in FIG. 7B, also includes the concept of a look-ahead point 65. However, instead of computing an arc, this algorithm computes the distances between the wheels and the look-ahead point 65. A steering control algorithm then attempts to keep the distances the same by adjusting the velocities of the drive wheels in proportion to the difference between the distances.

Figure 4:
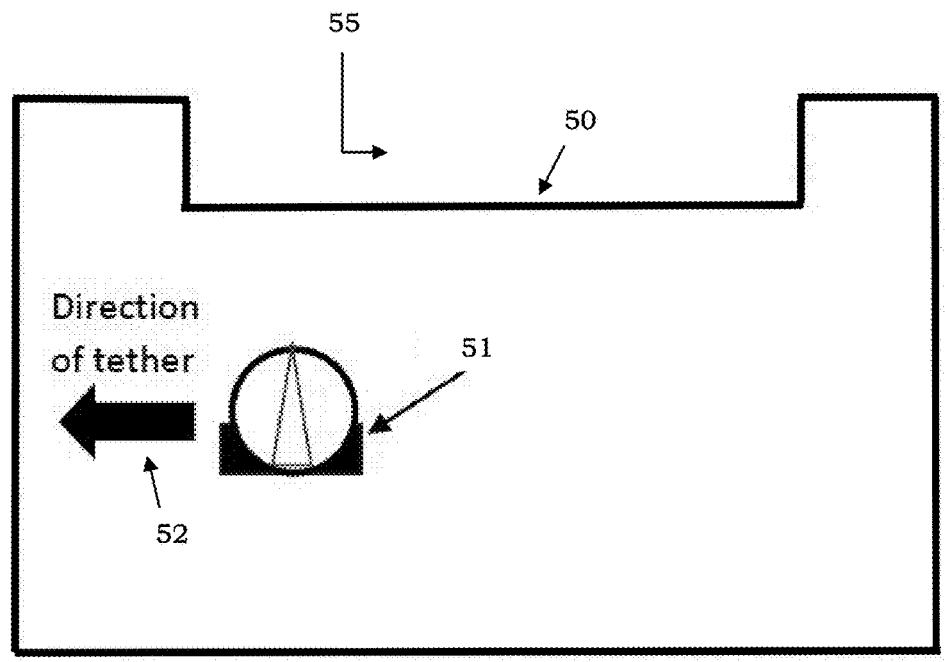
FIG. 4 shows an example of a concrete floor area.
Figure 5:
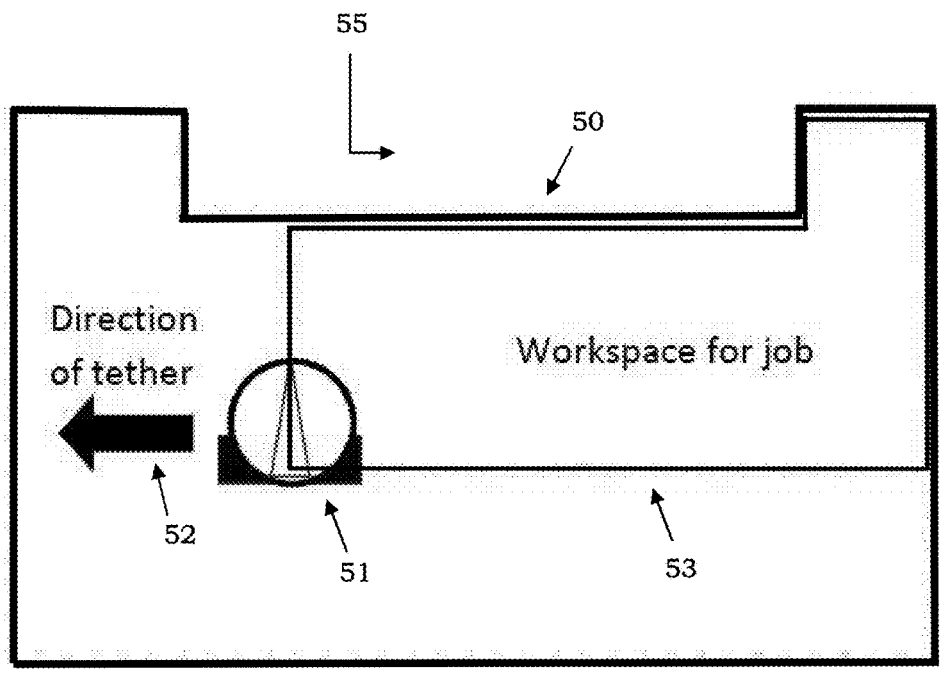
FIG. 5 shows the area of the concrete floor to be polished by the automatic concrete polishing system.

The path planning module 38 initiates when the vehicle 51 has been positioned at its starting location for a polishing task. The laser rangefinder first measures a 2D "slice" of the walls and corners of the environment resulting in an area 50 consisting of rectangular shapes and a cut-out area 55 such as the example shown in FIG. 4. This information is used by the path planning module 38. The path planning module 38 can also use information regarding whether the vehicle 51 will be moving to the left or right, as this will dictate the position of an electrical power cord tether 52 connected to the vehicle. FIG. 5 shows an example where the vehicle 51 will be moving to its right. Given the power demands of the drive actuators and polishing head, a hardwired electrical connection is desirable for long-duration polishing projects. After receiving the information from the laser rangefinder, the path planning module 38 defines the workspace 53 for the polishing job, which may be a subset of the overall building area 50 based on the initial location of the vehicle 51, as shown in FIG. 5.

Figure 6A:
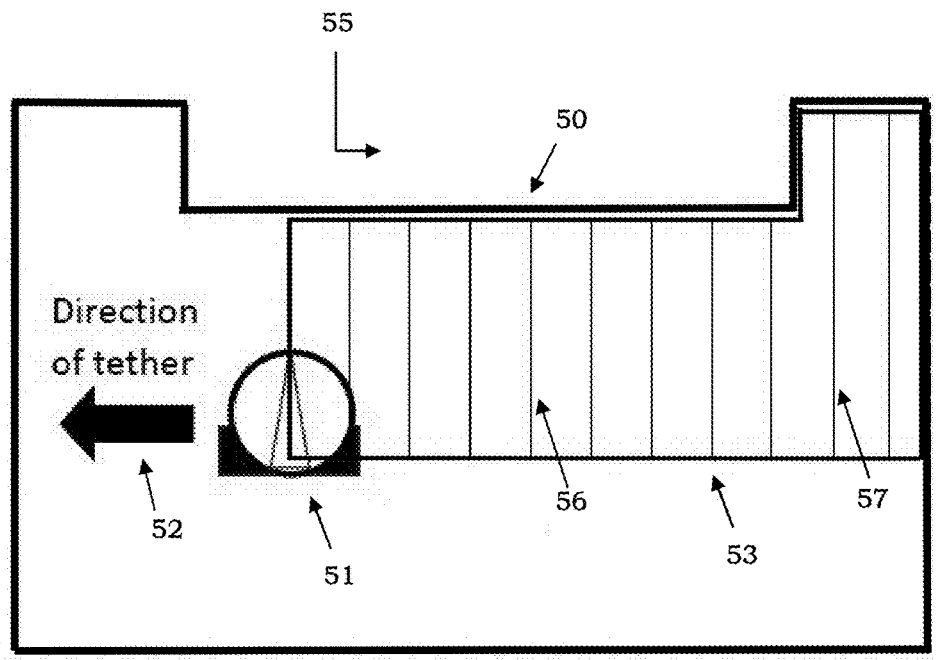
FIGS. 6A-6H shows the work area divided into lanes by the path planning system, with the automatic concrete polishing system traversing along the lanes.

Once the workspace 53 has been defined, the path planning module 38 uses simple geometric reasoning to construct the path and overall coverage pattern. In a first step, the path planning module 38 constructs a series of "lanes" 56 parallel to the initial orientation of the vehicle 51, as shown in FIG. 6A. If there are cut-outs 55, the lanes may be of different lengths; extended lanes 57 are shown on the right of FIG. 6A. The distance between the lanes 56 and 57 is determined by the width of the polishing head (a fixed value) and the desired overlap between lanes 56 and 57 (a value which can be determined by the operator). At this stage, a series of vehicle 51 motion instructions is generated.

Figure 6B:
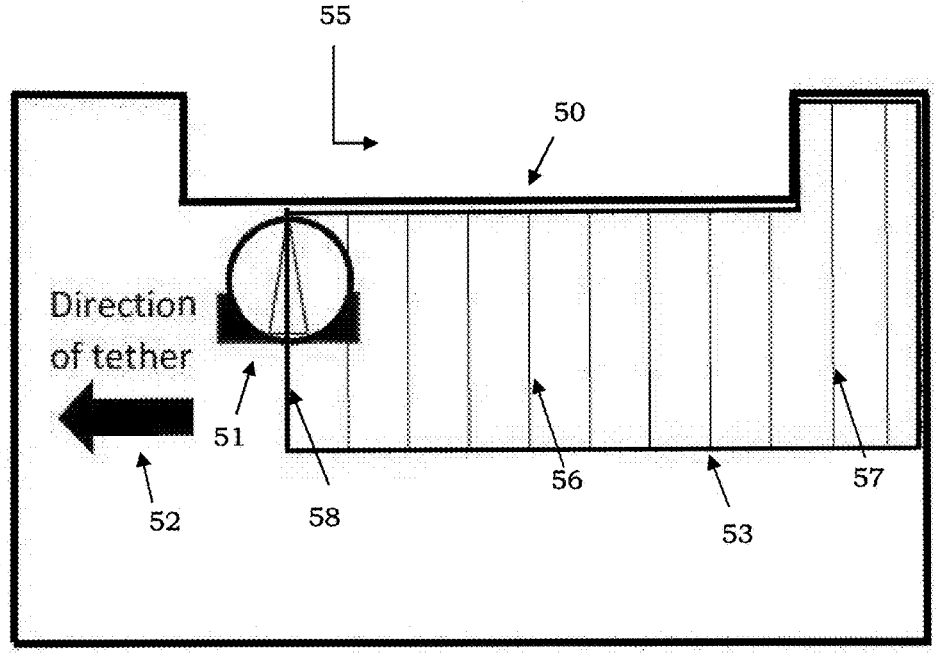
Figure 6C:
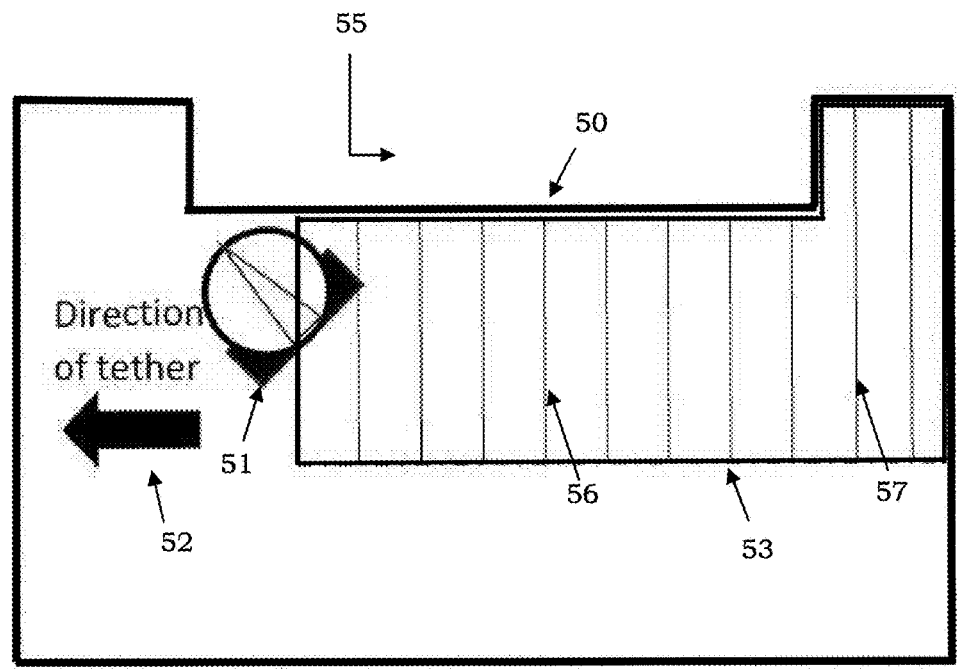
Figure 6D:
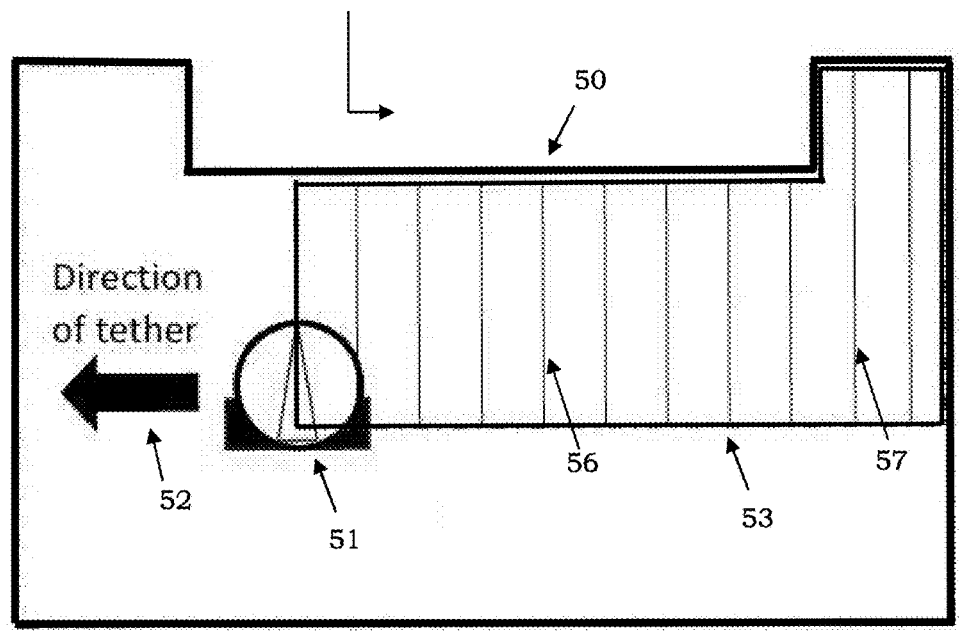

As an example of a path followed by the vehicle 51, at a first step, the vehicle 51 moves forward along the first lane 58 to the top of the boundary 59 of the workspace 53, which is shown in FIG. 6B. A side-to-side wiggle of the vehicle 51 can be programmed into the propulsion system to ease starting, as is done by operators of manual machines. Next, when the vehicle 51 reaches the end of the lane 58, the vehicle 51 rotates to the left (as shown in FIG. 6C), then to the right, then aligns straight with the first lane 58 again to complete a second pass back to the starting point (as shown in FIG. 6D). The angle of rotation is a parameter that can be set by the operator.

Figure 6E:
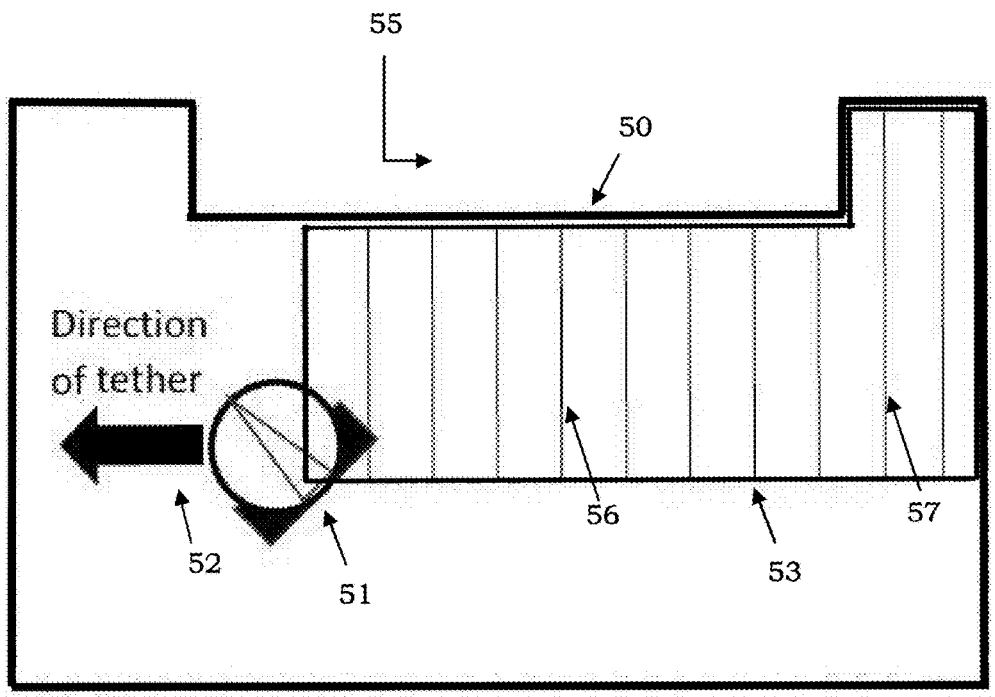
Figure 6F:
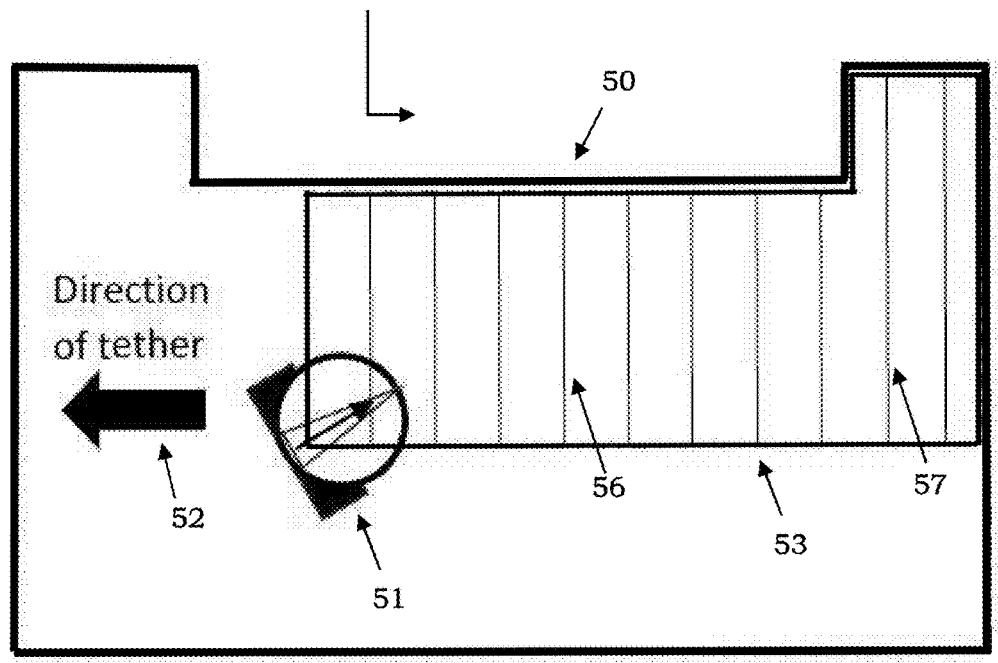
Figure 6G:
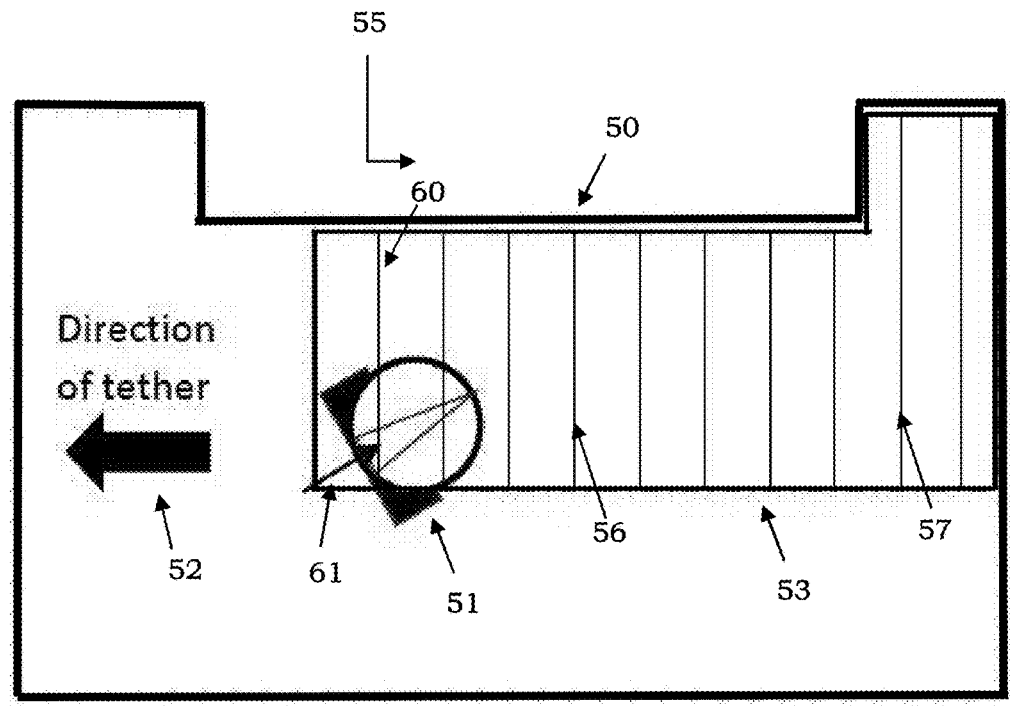
Figure 6H:
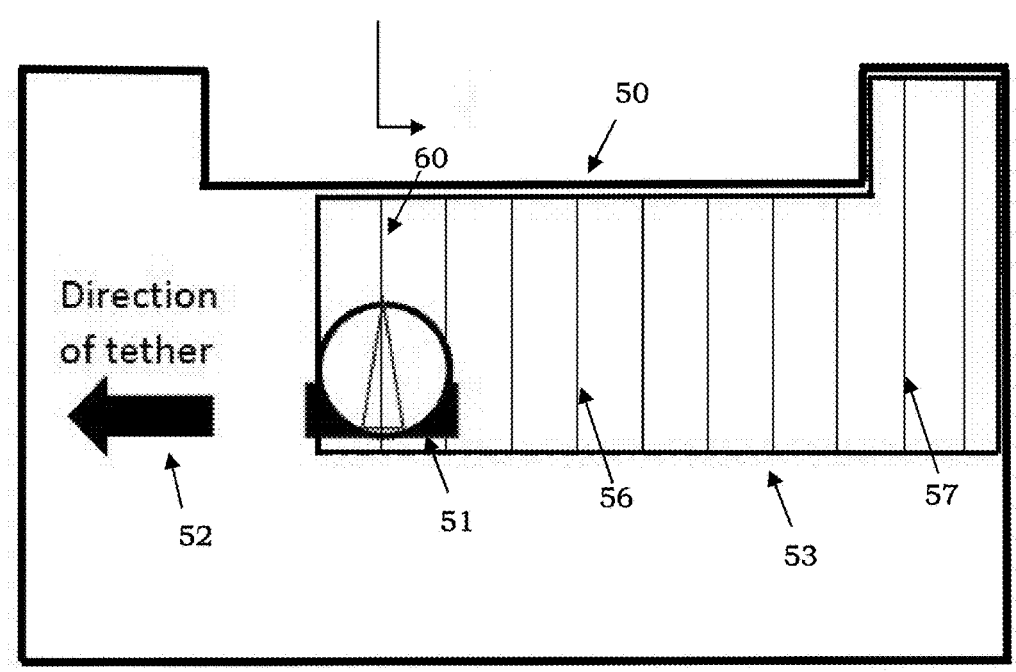

A left then right rotation (which is depicted in FIG. 6E) can be completed before moving to the second lane 60. To begin preparing or maintaining the second lane 60, which is adjacent to the first lane 58, the vehicle 51 is angled towards the second lane 60 before moving from its position in the first lane 58. This motion is represented in FIG. 6F. The angle can be determined as a function of the lane separation. Once angled, the vehicle 51 moves along the diagonal line 61 to the second lane 60, where it rotates so its path is parallel to the length of the lane (as shown in FIGS. 6G-6F). This sequence is repeated until all lanes have been prepared or maintained.

An operator can control the automatic concrete polishing system via a user interface 33. The interface 33 can be attached to the vehicle or it can be connected wirelessly through a laptop, smartphone, or other mobile device. In one configuration, the interface 33 is accessible both on the vehicle and remotely. The interface 33 allows the operator to quickly and easily configure, start, and stop the automated operation.

As part of the onboard configuration, the interface 33 comprises a push button menu on the vehicle 51 to let the operator configure and start the automated procedure without needing to use the computer interface 33. A knob or dial, such as a digital potentiometer, allows the operator to adjust the drive speed of the vehicle 51. For an emergency stop or obstacle-stop event, user intervention will be required to restart the vehicle 51. The onboard interface further comprises a flashing beacon 34 to indicate when it is operating under computer control. In one configuration, the interface 33 further includes a USB and Ethernet port for debugging purposes and for software upgrades, data acquisition, or other diagnostic functionality.

The off-board interface 33 comprises a wireless communication system between the vehicle 51 and a laptop or other mobile device. Functionality provided on the off-board interface 33 can include a coverage map (i.e. where the vehicle 51 has completed polishing). Other information provided on the off-board interface 33 includes total operational time, time since last power on, time the polishing heads are moving, current linear distance traveled, current area covered, and percent completion of the current coverage pattern, among others.

Other features of the interface 33 include the ability of the operator to: (1) configure the various parameters and system settings of the system, such as lane overlap, angle to turn, angular speed in which to rotate the vehicle, and type of path; (2) monitor the position of the vehicle during autonomous operation; (3) display statistics such as total operational time, total time since last power on, total time polishing heads have been running, current linear distance traveled, current area covered, completion percentage of the overall job, and estimated time to completion; (4) identify where the vehicle has and has not covered in a workspace; (5) view the laser data showing the outlines of the workspace; (6) monitor the health of the system; (7) remotely stop the motion of the vehicle, if needed; (8) see the status of the on-board emergency stop buttons; and (9) view error messages.

As part of its capabilities, the system will control the on/off and speed of the polishing heads in order to start and stop them appropriately (e.g. ramp up/ramp down to avoid scratching the floor). These parameters can also be adjusted via the user interface.

Referring now to the drawings, FIG. 1 shows a schematic of the power system 10. An AC/DC converter 13, which connects, through a main power switch 12 to a input wall power unit 11 and supplies power to the drive actuators, computer processor, signal lights, beacon, vehicle speed control, laser rangefinder (including the pan table in some embodiments), obstacle detection bumpers, and wireless communication system (as shown).

The computer processor is any computing device capable of executing machine readable instructions, such as a microcomputer, microprocessor, microcontroller, an application specific integrated circuit, a programmable logic array, logic device, digital signal processor, or another data processor and supporting electronic hardware and software. The processor runs all of the system software, communicates with the off-board laptop computer interface, receives sensor inputs, and commands the drive actuators for autonomous motion. In one configuration, the processor runs the Ubuntu Linux operating system.

Figure 2:
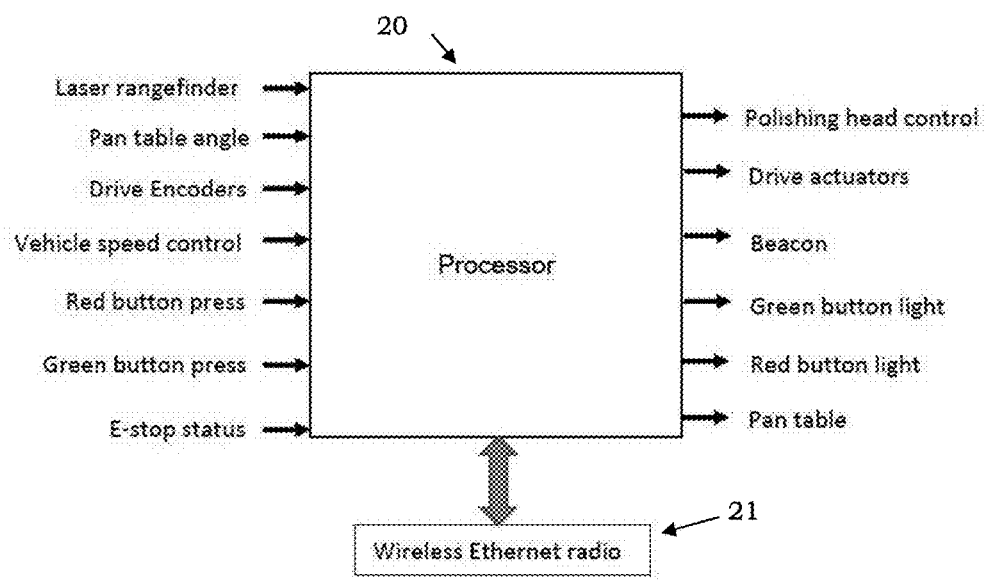
FIG. 2 is a schematic showing the communication between various components and subsystems of the automatic concrete polishing system and a processor.

FIG. 2 shows the various sensors and devices with data output connected to the processor 20. These components, as shown on the left side of the diagram, include the laser rangefinder, pan table angle, drive encoders, vehicle speed control, and manual shutoff switches. The processor connects to several additional components, as shown on the right, to control these items. Components receiving input from the processor include the polishing head, drive actuators, beacons, warning lights, manual buttons, and rangefinder pan table. Further shown in FIG. 2 is a wireless communications device 21.

The manual buttons 32a and 32b are push button (one red and one green, for example) mounted on the vehicle 51 and are part of the onboard interface. The states of the button lights (off, solid, or flashing) will indicate the different states of the automatic concrete polishing system (see Table 1). The operator will push the various buttons to configure, start, and stop the automated process as per the operational procedure. The flashing beacon 34 visually indicates that the vehicle is being moved under computer control.

TABLE 1

|  | BEACON ON | BEACON OFF |
|---|---|---|
| BLINKING RED | Obstacle detected, but unable to move. Vehicle stopped. | Booting up. |
| SOLID RED |  | Error condition-consult the user interface for more information. |
| BLINKING GREEN | Obstacle/e-stop cleared-press to restart. | (start of job): Planning path. (end of job): Vehicle has reached the end of the path. |
| SOLID GREEN | Running in autonomous mode. | Ready to run in autonomous mode. |

Figure 3:
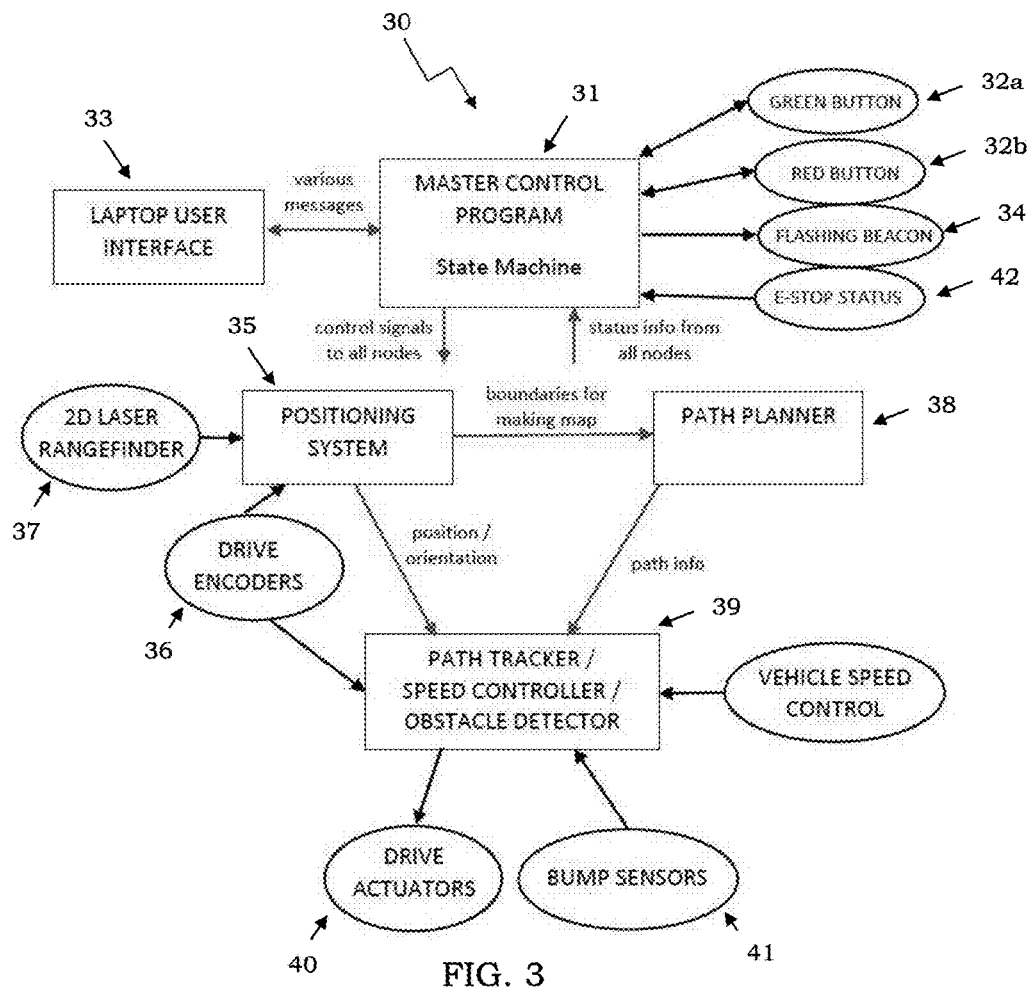
FIG. 3 is an outline of the software architecture, showing interconnection between software modules and hardware components, in one configuration.

FIG. 3 shows a block diagram of the various software components of the system 30 and the connection of the various sensors, according to one embodiment. In this example, the software is written in C++ and run under a Linux operating system. However, other software languages or operating systems can be used. The software architecture is the Robot Operating System (ROS), which provides the ability to quickly and easily create independent software modules that communicate to each other. Each box in FIG. 3 represents an individual software module (ROS Node) and ovals are sensors or other pieces of hardware in the automatic concrete polishing system. ROS-specific messages are shown as arrows between boxes.

Referring again to FIG. 3, the master control program 31 is the main program that orchestrates the actions of all other software modules. This module maintains the system state and status, controls the various onboard button lights 32a and 32b, and e-stop or emergency stop status light 42 and beacon 34, and communicates with the user interface software node running on the mobile device 33. The positioning system 35 is the software module receives both angular position measurements from the encoders on the drive motors 36 and range data from the 2D rangefinder 37, which it combines to compute the vehicle's position and orientation in the workspace. At startup, the laser rangefinder data is also sent to the path planning module 38 to be used to create a coverage pattern given the boundaries of the workspace measured with the 2D laser rangefinder. The path tracker/speed controller/obstacle detector 39 uses the vehicle's position/orientation information to compute the commands to the drive actuators 40 that allow the vehicle to follow the path planned by the path planning module 38 at the desired vehicle speed. It also monitors the obstacle bump sensors 41 and stops the vehicle if an obstacle is detected.

Figure 8:
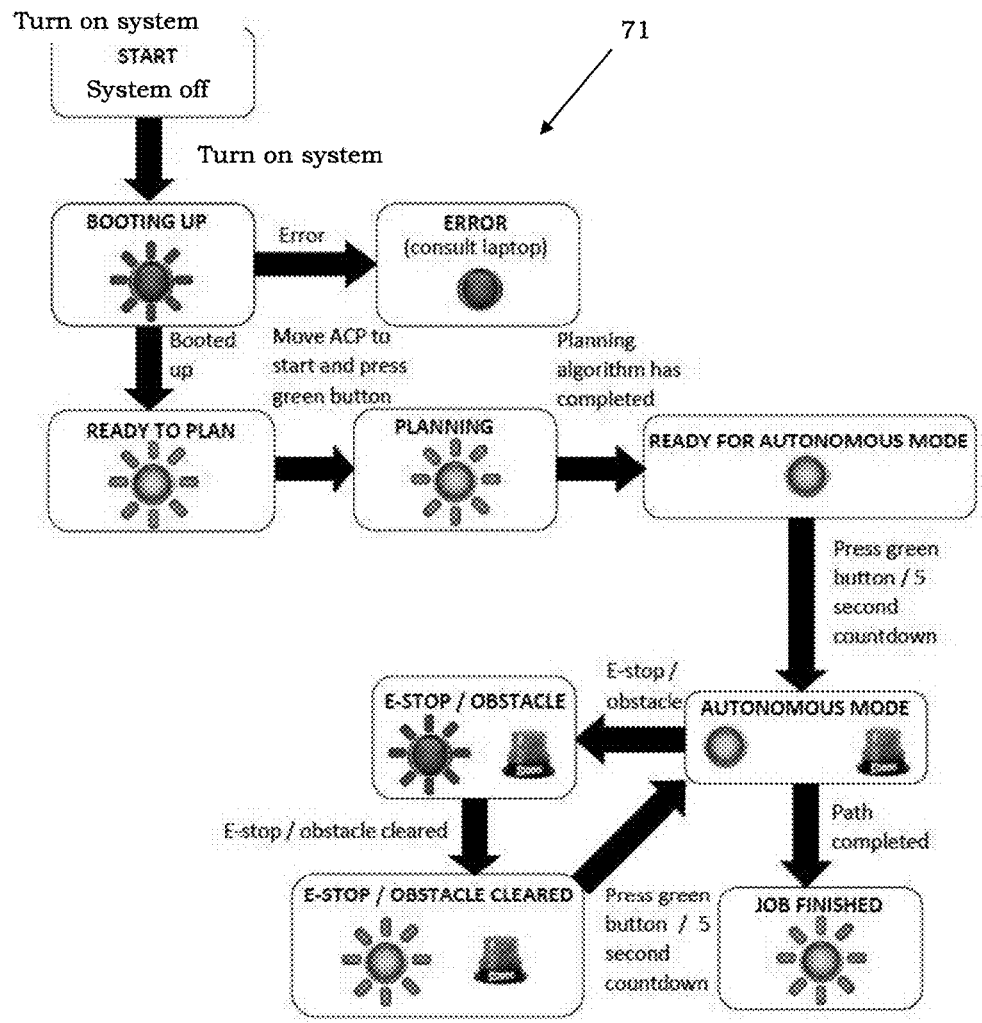
FIG. 8 is a block diagram of the operational procedure, according to one embodiment.

FIG. 8 is a flow diagram showing the various operations performed to start the system 71 and clear any error messages. An operator using the system 71 performs a normal set-up and preparation of the vehicle. Next, the operator launches the system's user interface 33 on the mobile device, such as a laptop. After starting the user interface, the operator turns on the vehicle's systems using the main vehicle on/off switch. At this stage, the off-board interface initiates and connects to the system's master control program. As shown in FIG. 8, the red button 32*b* will blink during boot up. If boot up is successful and all systems are functioning, the green button light 32*a* will start blinking. The blinking green light 32*a* indicates the system is ready to plan its path. If boot up was not successful, the red button 32*b* will change to solid and the operator is prompted to consult the off-board user interface for more information on any errors.

After the systems boot up successfully and the green light indicates that the system 71 is ready to plan its path, the operator places the vehicle 51 in the workspace to be polished. In one embodiment, the operator places the vehicle at the starting point and press the blinking green button 32*a* to mark the vehicle's starting position. In the next step of the process, the system defines its workspace and plans a coverage pattern. The coverage pattern will appear on the off-board user interface and the green button 32*a* will change to solid, indicating the system 71 is ready for autonomous mode (see FIG. 8).

If the path looks acceptable, the operator performs any other necessary vehicle operations and presses the solid green button 32*a* to engage autonomous mode. The beacon 34 on the vehicle 51 starts to flash to indicate autonomous control. Next, the vehicle 51 beings moving and follows the path. If the vehicle 51 does not move and the red button 32*b* begins to blink, the system 71 has encountered an obstacle or the emergency stop button is depressed. When the vehicle 51 has completed following the path, it will stop, the beacon 34 turns off, and the green button 32*a* begins blinking. The off-board interface indicates that the system has completed the polishing job.

With respect to obstacle detection during autonomous operation, the vehicle will stop moving if an object is blocking the planned path. The vehicle may also stop moving if the emergency stop button on the vehicle has been activated or if a stop button on the off-board user interface has been pressed. In all of these situations, the beacon 34 remains on and the red button begins to blink. The red button 32*b* will stop blinking (indicating the stop condition is no longer present) when the physical emergency button has been reset or the obstacles have been cleared. When the stop condition no longer exists, the status indicator light goes from blinking red to blinking green and operations can resume.

While the disclosure has been described in detail and with reference to specific embodiments thereof, it will be apparent to one skilled in the art that various changes and modification can be made therein without departing from the spirit and scope of the embodiments. Thus, it is intended that the present disclosure cover the modifications and variations of this disclosure provided they come within the scope of the appended claims and their equivalents.

What is claimed is:

1. A floor preparation or maintenance system, comprising:
a sensor arrangement for generating a map of an area to be prepared or maintained, wherein the map is generated prior to movement of a concrete polishing or grinding machine and is not modified during the movement of the concrete polishing or grinding machine;
a device for storing the map and a plan based on the map, wherein the plan includes a coverage pattern for the concrete polishing or grinding machine, wherein the coverage pattern includes a plurality of lanes comprising at least two lanes that overlap; and
the concrete polishing or grinding machine for preparing or maintaining a floor in accordance with the plan.

2. The floor preparation or maintenance system of claim 1, wherein the concrete polishing or grinding machine comprises at least one actuator and at least one encoder connected to each wheel of the concrete polishing or grinding machine.

3. The floor preparation or maintenance system of claim 1, wherein the floor preparation or maintenance system further comprises a navigation system configured to interact with the sensor arrangement to generate the coverage pattern for the map.

4. The floor preparation or maintenance system of claim 1, wherein the navigation system is further configured to control operation and speed of polishing heads on the concrete polishing or grinding machine.

5. The floor preparation or maintenance system of claim 3, wherein the navigation system is further configured, through interaction with the sensor arrangement, to detect obstacles in the coverage pattern of the map.

6. The floor preparation or maintenance system of claim 3, wherein the navigation system is further configured to interact with status indicator lights and beacons and data outputs on the concrete polishing or grinding machine.

7. The floor preparation or maintenance system of claim 1, wherein preparing or maintaining the floor includes one or more of grinding, sealing, polishing, and finishing the floor.

8. The floor preparation or maintenance system of claim 2, wherein the at least one actuator causes rotation of a corresponding wheel and the at least one encoder records the rotation of the corresponding wheel to determine one or more of a position, a heading, and a speed of the concrete polishing or grinding machine.

9. The floor preparation or maintenance system of claim 1, wherein the floor preparation or maintenance system further comprises a laser rangefinder disposed on a continuous pan table or in proximity to a spinning mirror, wherein the laser rangefinder is used to determine one or more of a position, a heading, and a speed of the concrete polishing or grinding machine.

10. The floor preparation or maintenance system of claim 8, wherein the floor preparation or maintenance system further comprises a laser rangefinder, wherein:
the at least one encoder records relative information relating to one or more of the position, the heading, and the speed of the concrete polishing or grinding machine;

the laser rangefinder records absolute information relating to one or more of the position, the heading, and the speed of the concrete polishing or grinding machine; and the relative information and the absolute information are used to determine one or more of the position, the heading, and the speed of the concrete polishing or grinding machine.

11. A method for operating a floor preparation or maintenance system, comprising:

generating, using a sensor arrangement, a map of an area to be prepared or maintained, wherein the map is generated prior to movement of a concrete polishing or grinding machine and is not modified during the movement of the concrete polishing or grinding machine;

storing, in a device, the map and a plan based on the map, wherein the plan includes a coverage pattern for the concrete polishing or grinding machine, wherein the coverage pattern includes a plurality of lanes comprising at least two lanes that overlap; and preparing or maintaining, using the concrete polishing or grinding machine, a floor in accordance with the plan.

12. The method of claim 11, wherein the concrete polishing or grinding machine comprises at least one actuator and at least one encoder connected to each wheel of the concrete polishing or grinding machine.

13. The method of claim 11, wherein the method further comprises interacting with the sensor arrangement to generate the coverage pattern for the map.

14. The method of claim 11, wherein the method further comprises controlling operation and speed of polishing heads on the concrete polishing or grinding machine.

15. The method of claim 13, wherein the method further comprises detecting, through interaction with the sensor arrangement, obstacles in the coverage pattern of the map.

16. The method of claim 13, wherein the method further comprises interacting with status indicator lights and beacons and data outputs on the concrete polishing or grinding machine.

17. The method of claim 11, wherein preparing or maintaining the floor includes one or more of grinding, sealing, polishing, and finishing the floor.

18. The method of claim 12, wherein the method further comprises causing, using the at least one actuator, rotation of a corresponding wheel and recording, using the at least one encoder, the rotation of the corresponding wheel to determine one or more of a position, a heading, and a speed of the concrete polishing or grinding machine.

19. The method of claim 11, wherein the method further comprises using a laser rangefinder to determine one or more of a position, a heading, and a speed of the concrete polishing or grinding machine, wherein the laser rangefinder is disposed on a continuous pan table or in proximity to a spinning mirror.

20. The method of claim 18, wherein the method further comprises:

recording, using the at least one encoder, relative information relating to one or more of the position, the heading, and the speed of the concrete polishing or grinding machine;

recording, using the laser rangefinder, absolute information relating to one or more of the position, the heading, and the speed of the concrete polishing or grinding machine; and determining, based on the relative information and the absolute information, one or more of the position, the heading, and the speed of the concrete polishing or grinding machine.

* * * * *

UNITED STATES PATENT AND TRADEMARK OFFICE
CERTIFICATE OF CORRECTION

PATENT NO. : 10,328,577 B2  
APPLICATION NO. : 15/491938  
DATED : June 25, 2019  
INVENTOR(S) : Michael Lawrence et al.

Page 1 of 1

It is certified that error appears in the above-identified patent and that said Letters Patent is hereby corrected as shown below:

On the Title Page

In item (73) Assignee:
Please replace "Xiaoyu Arasive Inc." with --Xiaoyu Abrasive Inc.--.

Signed and Sealed this
Twenty-seventh Day of August, 2019

Andrei Iancu
*Director of the United States Patent and Trademark Office*